Nov. 11, 1930.   R. J. BEATTY   1,781,565
METHOD AND APPARATUS FOR MAKING ARTICLES OF GLASSWARE
Filed March 13, 1928   2 Sheets-Sheet 1

INVENTOR,
Robert J. Beatty.
BY
ATTORNEY

Patented Nov. 11, 1930

1,781,565

UNITED STATES PATENT OFFICE

ROBERT J. BEATTY, OF COLUMBUS, OHIO, ASSIGNOR TO THE FEDERAL GLASS COMPANY, OF COLUMBUS, OHIO, A CORPORATION OF OHIO

METHOD AND APPARATUS FOR MAKING ARTICLES OF GLASSWARE

Application filed March 13, 1928. Serial No. 261,354.

My invention relates to method and apparatus for making articles of glassware. It has particular reference to a method and apparatus for making articles of glassware wherein the articles are finally shaped in a mold, other than a one-piece mold, without the production of ribs or seams on the article.

One of the usual processes used in producing glassware, such as tumblers, vases or similar glass articles, comprises forming a pressed blank, transferring the pressed blank to a blow mold, blowing the same to the desired finished shape, removing the blown blank from the blow mold, and subjecting the blown blank to the usual finishing operations. When a mold other than a one-piece mold is used in the final shaping operation, the finished article shows ribs or seams which are more or less unsightly and which preclude the making of the highest grades of ware.

I have found that, by reblowing a blown blank the exterior surface thereof will have been cooled to such an extent by the first blowing operation that, no rib or seam will be discernible on the finished article. My investigations also show that by partially shaping an article by blowing in a one-piece mold and then finally shaping the article by subjecting it to further shaping in a mold, which may or may not be a one-piece mold, no ribs or seams will be discernible on the finished article and also the mold marks left on the article by the contact of the surface thereof with the walls of the one-piece mold will be removed. Furthermore, by my method embodying steps outlined above, glassware may be produced, continuously and automatically, of a character superior to the ware resulting from other methods or processes.

The object of my invention is to provide a method and apparatus for shaping articles of glassware such as tumblers, dishes, vases or similar glass articles whereby no rib or seam will be discernible on the finished article.

Other objects of my invention will appear in the following detailed description and the preferred embodiment of my invention may be seen in the accompanying drawings wherein similar characters of reference designate corresponding parts and wherein.

Figure 1:
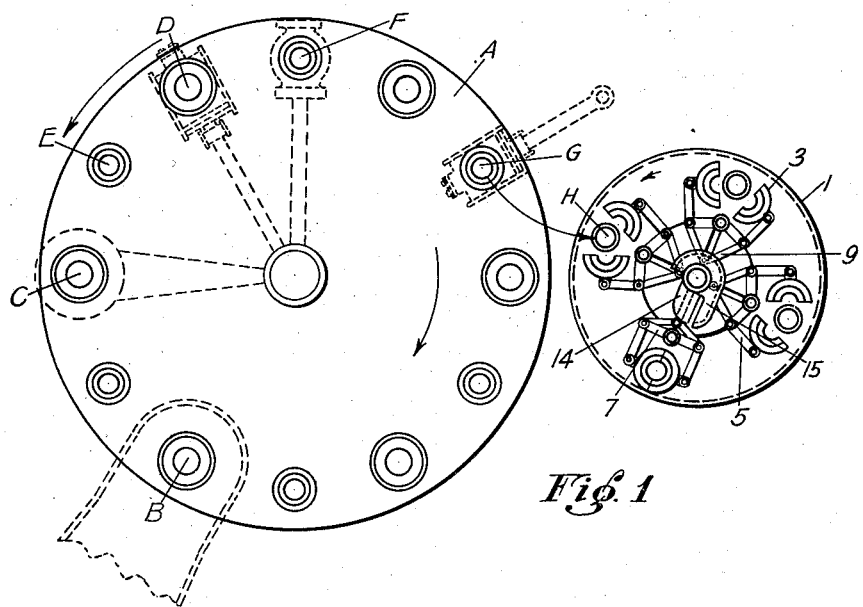
Figure 1 is a top plan view of the primary and secondary shaping tables which I employ.

In order that my invention may be readily understood, I will first describe in detail the steps embodied therein. Referring to Figure 1 of the drawings, the letter "A" designates a conventional rotary shaping table upon which are mounted the press molds and blow molds in which the charges of glass are subjected to the hereinafter described operations as the table is rotated to periodically advance the different molds from one position to another in their orbital path of travel. The letter "B" indicates the charging point or position where the charge of glass is deposited from the spout into the press mold positioned thereabeneath. After the charge of glass has been deposited in the press mold, the table is rotated, and the press mold containing the charge of glass is advanced to the position designated by the letter "C".

Figure 3:
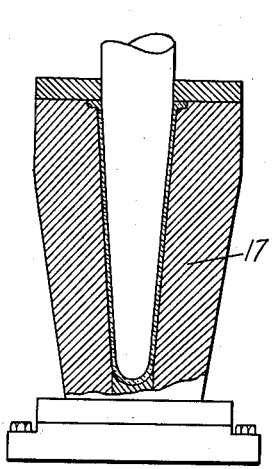
Figure 3 is a sectional view of a press mold.

When the press mold reaches the position C as a result of the rotation of the table, a plunger is caused to descend into the mold to press the charge of glass to the desired shape. Such operation is shown in Figure 3. The plunger then ascends from the mold and the table is rotated, moving the press mold to the position designated by the letter "D".

When the press mold containing the pressed glass blank reaches the position "D", the table is stopped, a transfer device descends upon the press mold, and the pressed blank is removed from the mold.

Figure 4:
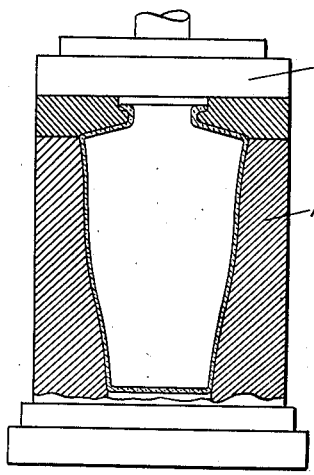
Figure 4 is a sectional view of the blow mold which I use on the primary shaping table.

The table is then rotated until the pressed blank suspended in the transfer device is directly over the blow mold which, at the time the blank is removed from the press mold, is at the station designated by the letter "E", whereupon the table stops and the pressed blank is delivered into the blow mold. The table is again rotated until the blow mold containing the pressed blank reaches the position designated by the letter "F", at which position a blow head descends upon the mold and blows the blank to the shape shown in Figure 4.

After the blank has been blown, the table is still further rotated until the mold reaches the position designated by the letter "G", at which point a suitable transfer device removes the blown blank from the mold and transfers it to a mold, which is preferably, other than a one-piece mold, on a secondary shaping table. The blown blank is delivered to the secondary shaping table at the point designated by the letter "H".

The molds are then closed and a suitable blow head descends upon the blown blank in the blow molds of the secondary shaping table and blows the partially shaped blank to its final shape, after which it is removed from such blow mold and subjected to the usual finishing operation.

My method, just previously described, comprises forming a pressed blank, partially shaping the pressed blank by blowing in a one-piece blow mold, transferring the partially shaped blank to a blow mold other than a one-piece blow mold, finally shaping the blank, and then subjecting the blank to the usual finishing operation.

The mechanism which I use to accomplish my purpose is, for the most part, of a conventional type of apparatus which is well-known to those familiar with the art. For instance, any type of spout may be used to deliver the charges of glass to the press molds on the primary shaping table A and any preferred means may be used for rotating this table. Also, any conventional form of block blow mold may be used on this table. Furthermore, the pressing means, transfer mechanism, and blow head may be of any form desired.

The secondary or final shaping means comprises a table 1, rotated in any preferred manner, mounted upon a stationary post 2. Blow molds 3 are mounted upon the upper surface of the table 1 and means are provided for opening and closing these molds about a mold base 4.

Such opening and closing means preferably comprises links 5 attached at one of their ends to the opposing sides of the blow mold 3 and pivotally attached as at 6 at their other ends to arms 7 which are, in turn, pivotally mounted upon a post 8 which is rigidly mounted upon the top of the table 1. Links 9 are pivotally attached at one of their ends to the same end of the arms 7 to which one end of the links 5 are attached and are pivotally attached at their opposite ends to a post 10.

The lower ends of the posts 10 are preferably reduced and are adapted to slide in radial slots 11 which are formed in a raised portion 12 of the table 1. The upper ends of the posts 10 have rollers 13 mounted thereon. Cams 14 and 15 are rigidly mounted upon a stationary post 2, the outer edge of the cam 14 bearing against substantially the center of the posts 10 and the turned down portion 16 of the cam 15 engaging the rollers 13 mounted on the posts 10.

Figure 2:
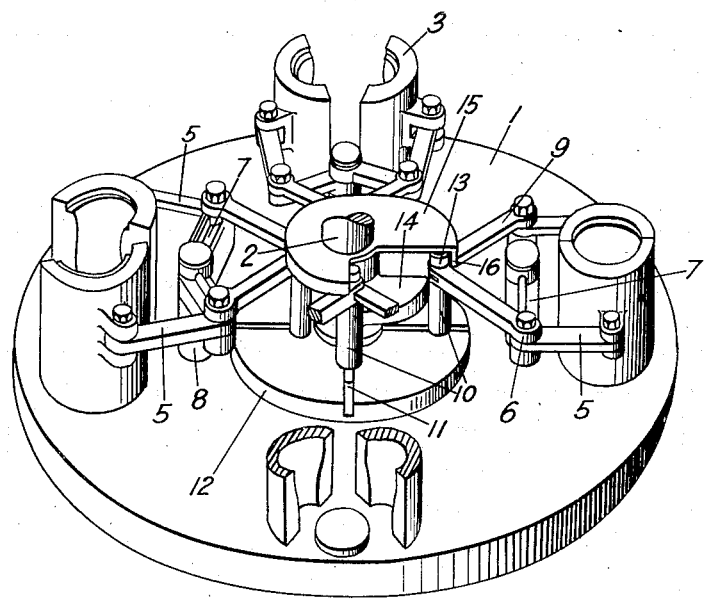
Figure 2 is a perspective view of the secondary shaping table shown in Figure 1.

As the table 1 is rotated, the cams 14 and 15 which are rigidly mounted on the stationary post 2 engage the posts 10 as just described. The cam 14 bearing against the center of the posts as shown in Figure 2, tends to push the posts outwardly, while the turned-down portion 16 of the cam 15 bearing against the rollers 13 of the posts tends to move the posts inwardly. Since the posts 10 are directly connected to the molds 3 by the toggle mechanism hereinbefore described, it will be apparent that the radial movement of the posts will cause the alternate opening and closing of the molds in synchronism with the rotation of the table 1.

In the operation of my device in accordance with the steps hereinbefore described, a pressed blank is formed in a press mold 17 as shown in Figure 3. The pressed blank is then transferred to a blow mold 18 shown in Figure 4, whereupon a blow head 19 descends on the blow mold and blows the blank to the shape shown.

Figure 5:
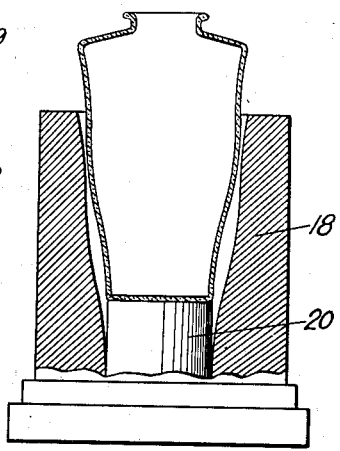
Figure 5 is a view similar to Figure 4 but showing the blown blank partially removed therefrom.

At this point it is important to note that the blow mold 18 is a one-piece mold and, as shown in Figure 5, is of such shape interiorly that the blown blank formed therein, although not always straight sided, may be removed therefrom by raising the plunger 20.

Figure 6:
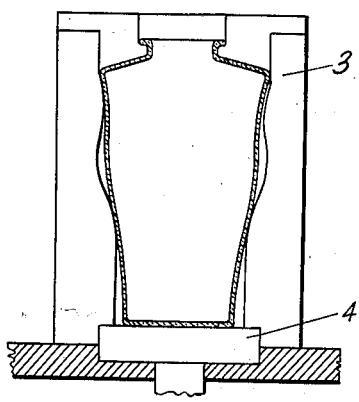
Figure 6 is a side view of the blow mold which I use on the secondary shaping table.
Figure 7:
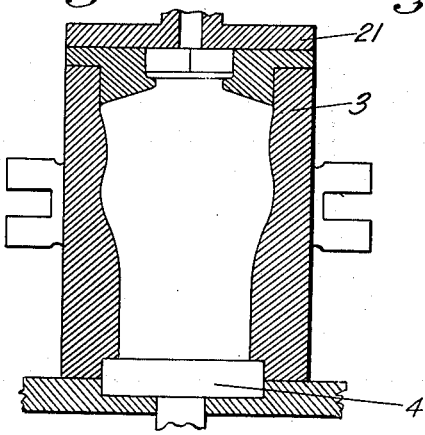
Figure 7 is a sectional view of the mold shown in Figure 6.
Figure 8:
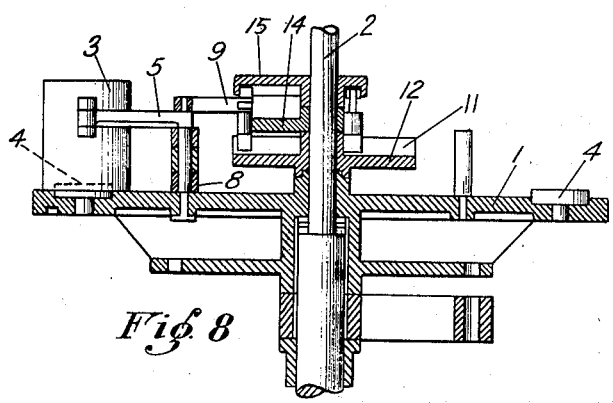
Figure 8 is a sectional view of the shaping table shown in Figures 1 and 2.

After the blank has been partially shaped in the blow mold 18, it is transferred to the blow mold 3 (shown in Figure 6), which is mounted on the table 1. The blow head 21 then descends on the blow mold 3 and the blank is blown to its final shape. The opening and closing of the blow molds 3 is accomplished by the toggle and cam mechanism hereinbefore described.

I have found that, during the primary blowing operation, a more or less tough outer skin or coating is formed on the glass article due to the cooling effect of the walls of the blow molds and other well-known factors.

When the blown blank is transferred to a blow mold, other than a one-piece mold, and the article is subsequently blown, the relatively tough outer skin or coating on the glass article will prevent the glass from entering the cracks between the mold sections.

I have also found that, by making the secondary shaping blow mold larger than the original blown blank throughout its entire length will result in a stretching of the glass blank when it is blown to final shape to such an extent that all marks left thereon as a result of the contact of the surface of the article with the walls of the primary shaping blow mold will be removed.

With my method and my apparatus, it is possible to make tumblers, dishes, vases or similar glass articles and impart to these an infinite variety of shapes hitherto considered impossible with pressed blown methods and apparatus and that these articles will be of a superior quality.

Various changes may be made in the details of the mechanism which I employ and changes may be made in the sequence of operation hereinbefore set out without departing from the scope of my invention.

Having thus described my invention, what I claim is:

1. The method of producing glassware which comprises pressing a blank in a one-piece mold, blowing the pressed blank in another one-piece mold to a shape that will still allow its removal therefrom, and then blowing the shaped blank in a mold other than a one-piece mold to a shape which would preclude removal from a one-piece mold.

2. The method of producing glassware which comprises pressing a blank in a one-piece mold, blowing the pressed blank in another one-piece mold to a shape that will still allow its removal therefrom, and then blowing the shaped blank in a two-piece mold to a shape which would preclude removal from a one-piece mold.

3. Apparatus for producing articles of glassware comprising a primary shaping table having both individual press and blow molds mounted thereon, said blow mold being of one-piece construction, and a secondary shaping table having multi-piece blow molds mounted thereon disposed adjacent said first-named shaping table and operating in timed relation with said primary shaping table.

4. Apparatus for producing articles of glassware comprising a primary shaping table, individual press and blow molds mounted on said shaping table, said blow molds being of one-piece construction, a secondary shaping table operating in timed relation with said primary shaping table, split blow molds mounted on said secondary shaping table, means for opening and closing said split blow molds and means for transferring articles of glassware from said primary shaping table to said secondary shaping table.

5. The method of producing glassware which comprises pressing a blank in a one-piece mold, blowing the blank in another one-piece mold to a shape that will still allow its removal therefrom and producing a skin about the exterior surface which is of such hardness that it cannot be impressed by irregularities in a mold other than a one-piece mold, and finally blowing the shaped blank in a mold other than a one-piece mold to a shape which would preclude removal from a one-piece mold thereby obtaining a seamless article.

6. The method of producing glassware which comprises pressing a blank in a one-piece mold, blowing the blank in another one-piece mold to a shape which will still allow its removal therefrom and producing a skin about the exterior surface which is of such hardness that it cannot be impressed by irregularities in a mold other than a one-piece mold, and finally blowing the shaped blank in a multi-piece mold to a shape which would preclude removal from a one-piece mold thereby obtaining a seamless article.

In testimony whereof I hereby affix my signature.

ROBERT J. BEATTY.